F. A. STEVENSON.
PUNCHING MACHINE.
APPLICATION FILED FEB. 10, 1914.
1,164,028.
Patented Dec. 14, 1915.
6 SHEETS—SHEET 3.
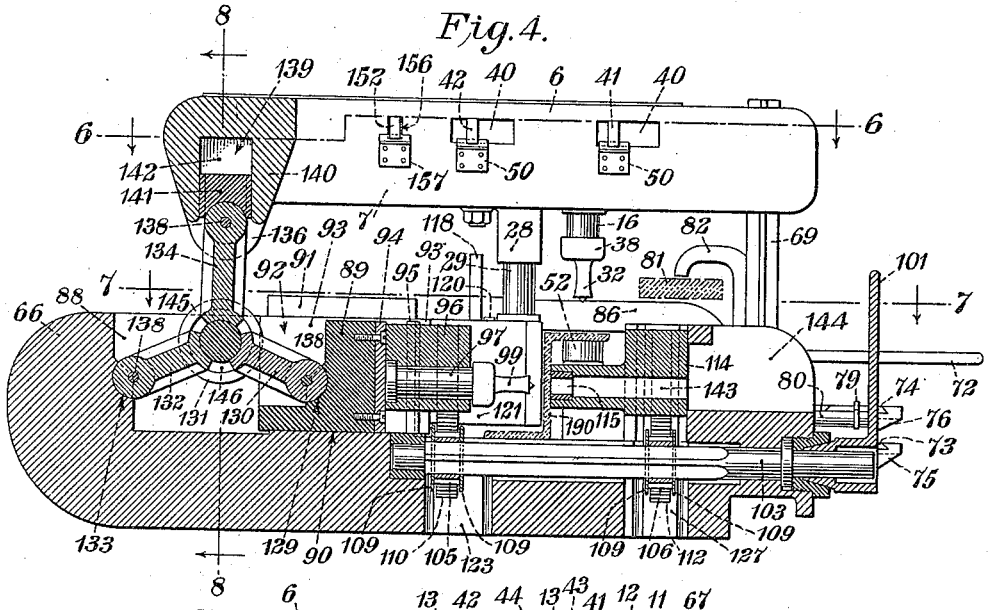
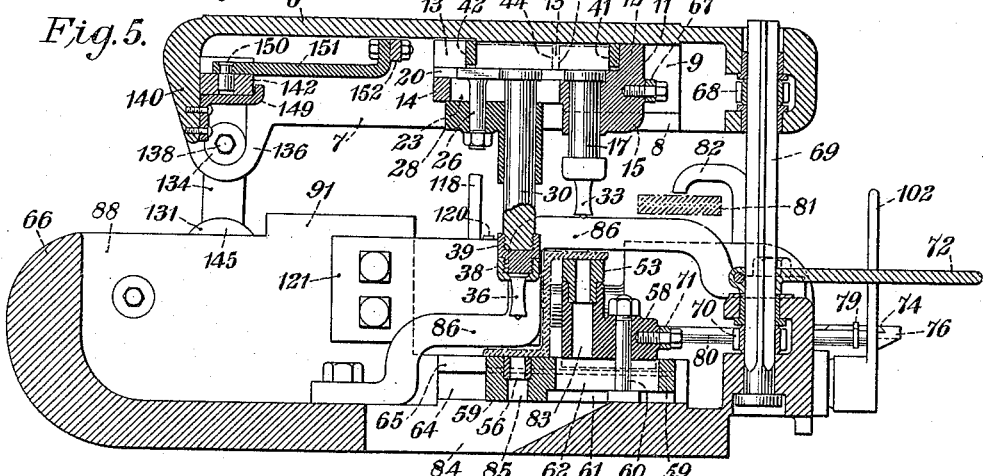
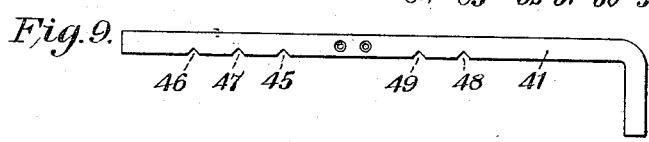
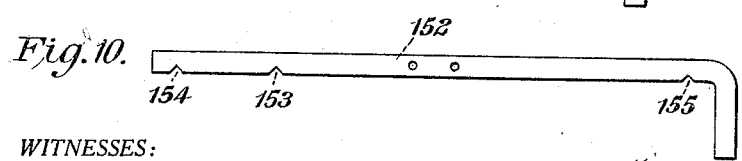
WITNESSES:
INVENTOR.
Frederick A. Stevenson
BY
F. H. Gibbs
ATTORNEY

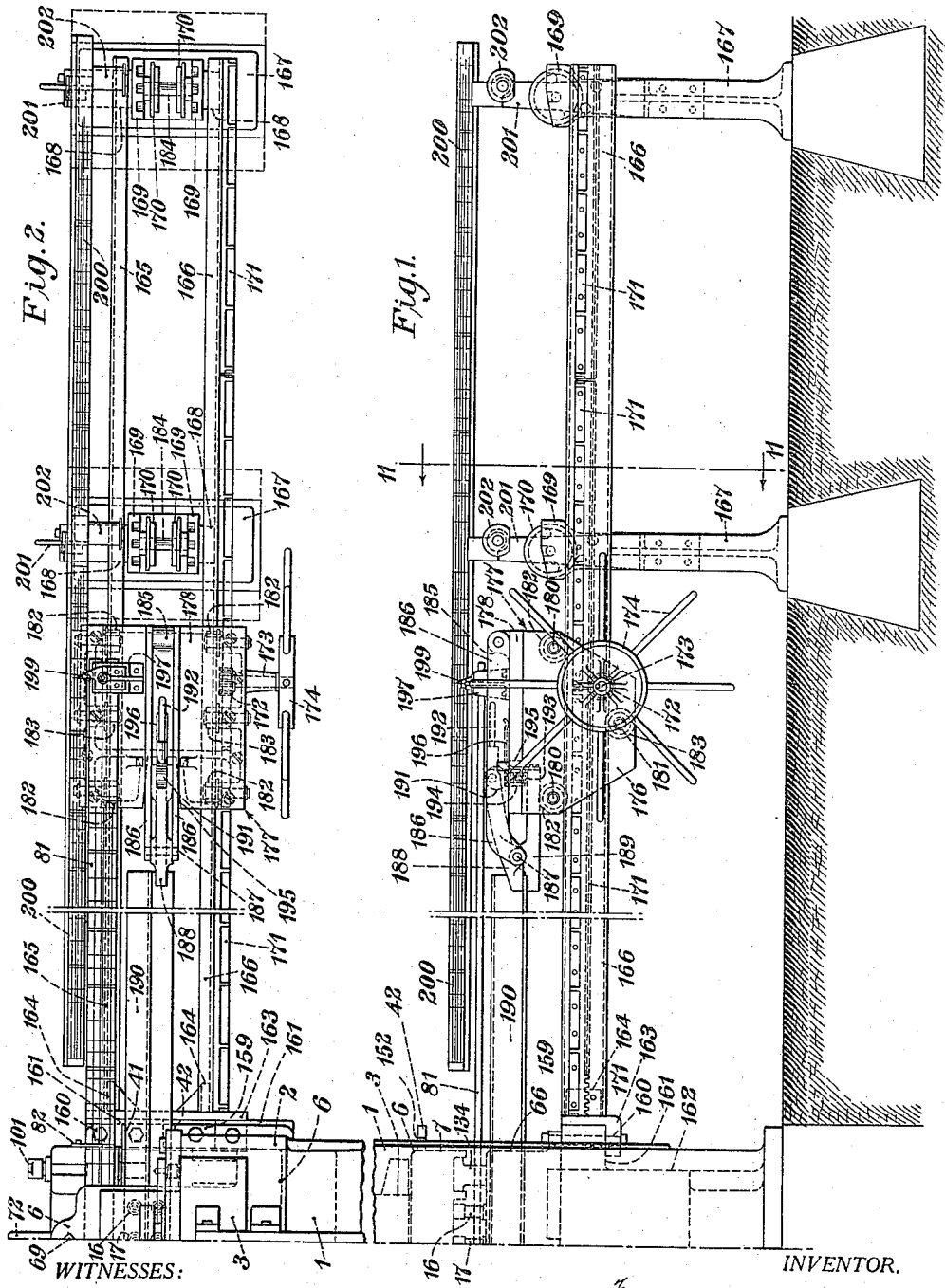
F. A. STEVENSON.
PUNCHING MACHINE.
APPLICATION FILED FEB. 10, 1914.
1,164,028.
Patented Dec. 14, 1915.
6 SHEETS—SHEET 1.
INVENTOR.
Frederick A. Stevenson
BY
J. H. Gibbs
ATTORNEY
WITNESSES:
C. L. Belcher

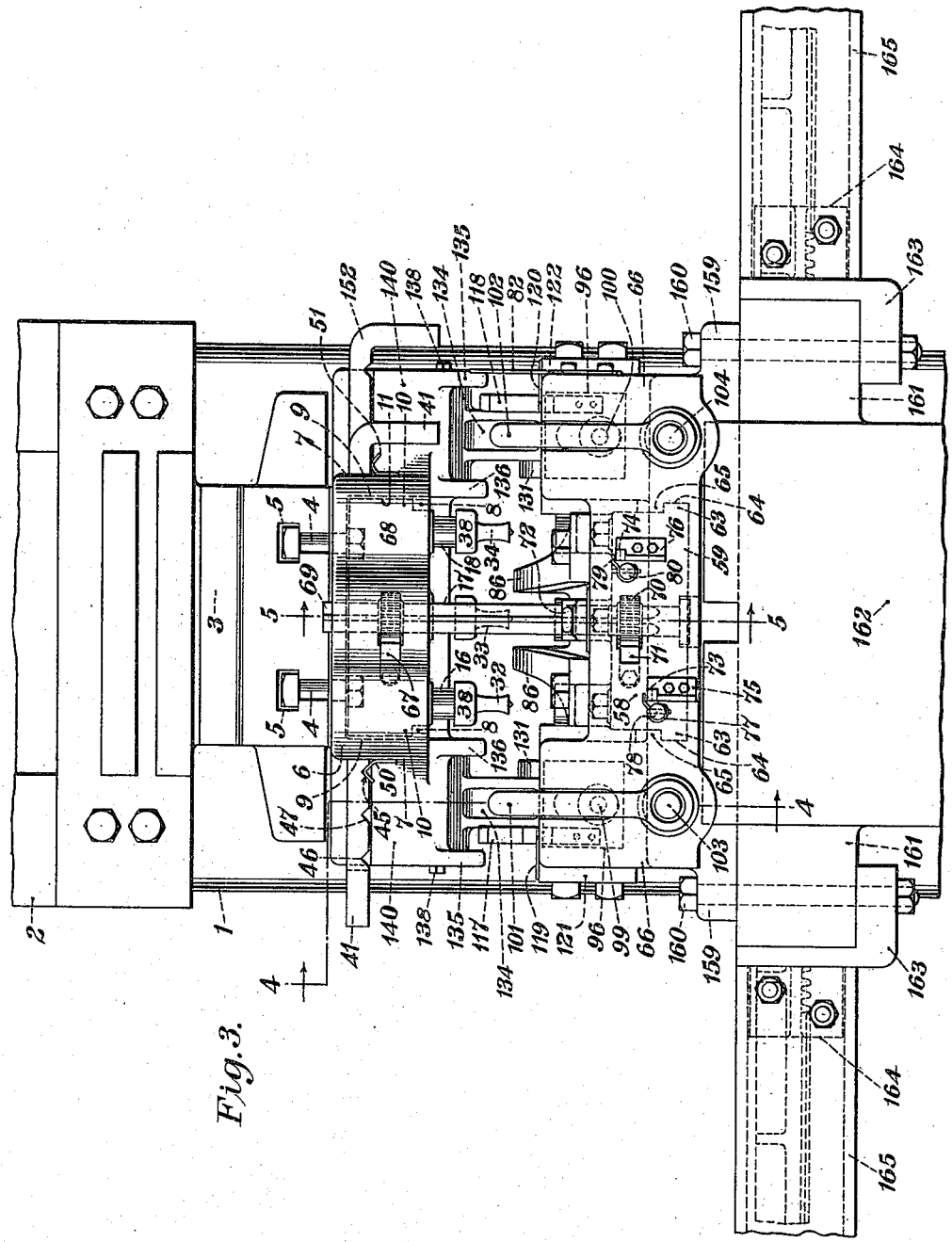

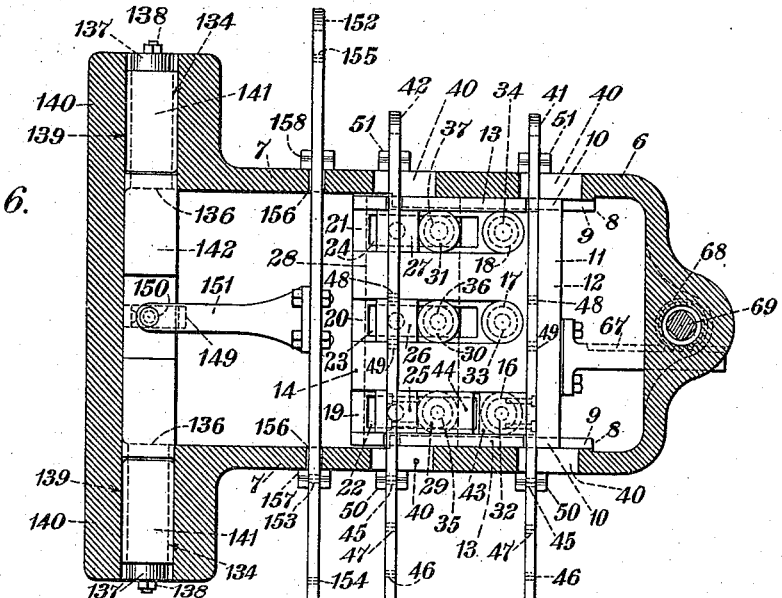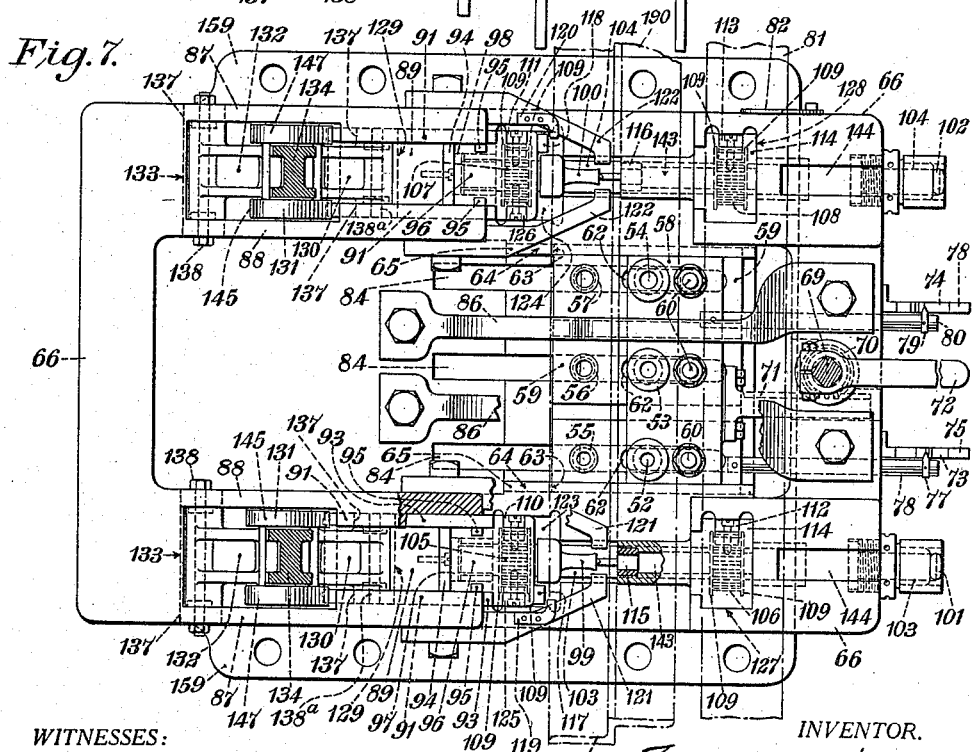

F. A. STEVENSON.
PUNCHING MACHINE.
APPLICATION FILED FEB. 10, 1914.
1,164,028.
Patented Dec. 14, 1915.
6 SHEETS—SHEET 5.
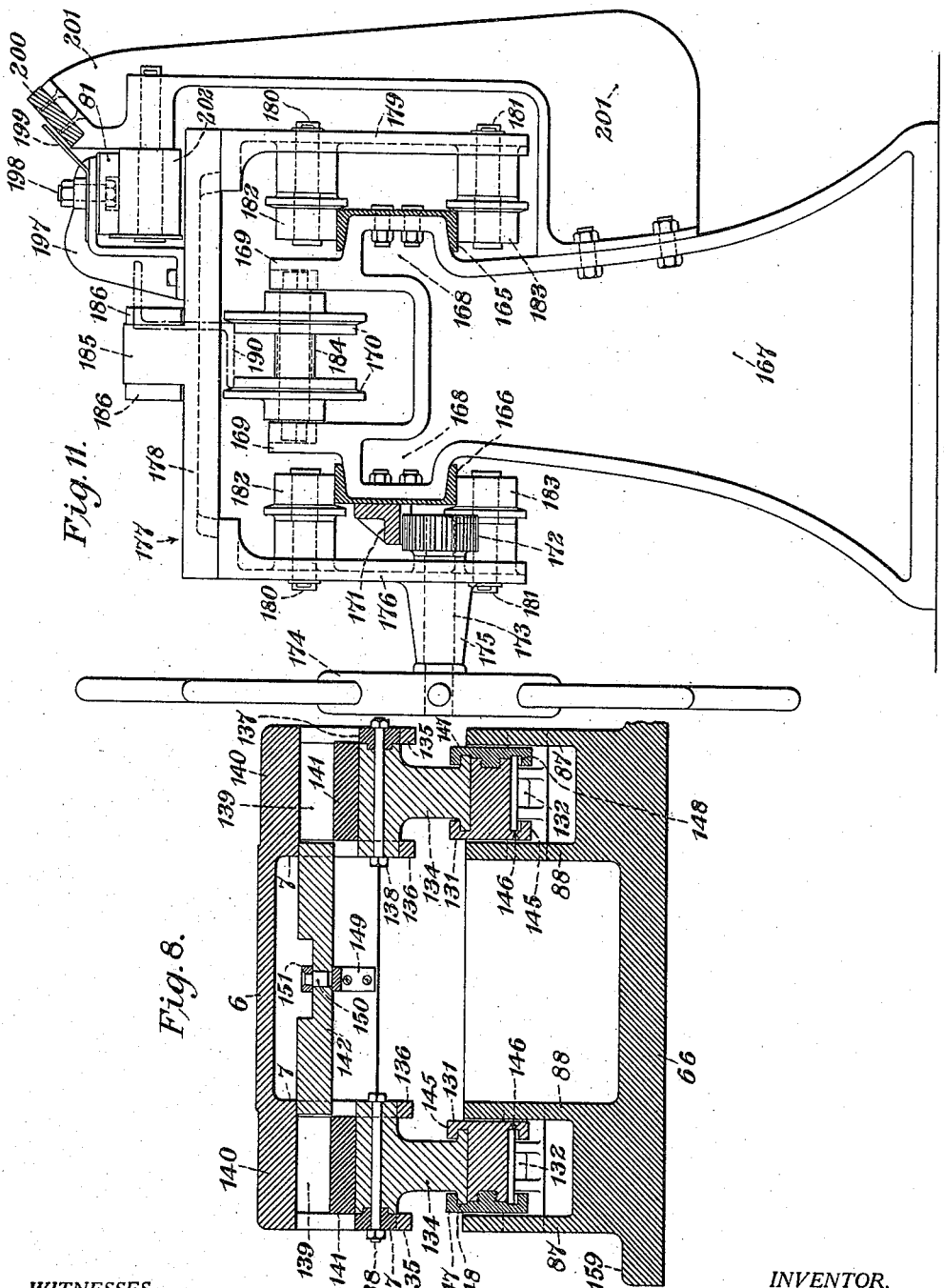
WITNESSES:
C. L. Belcher
INVENTOR.
Frederick A. Stevenson
BY F. H. Gibbs
ATTORNEY

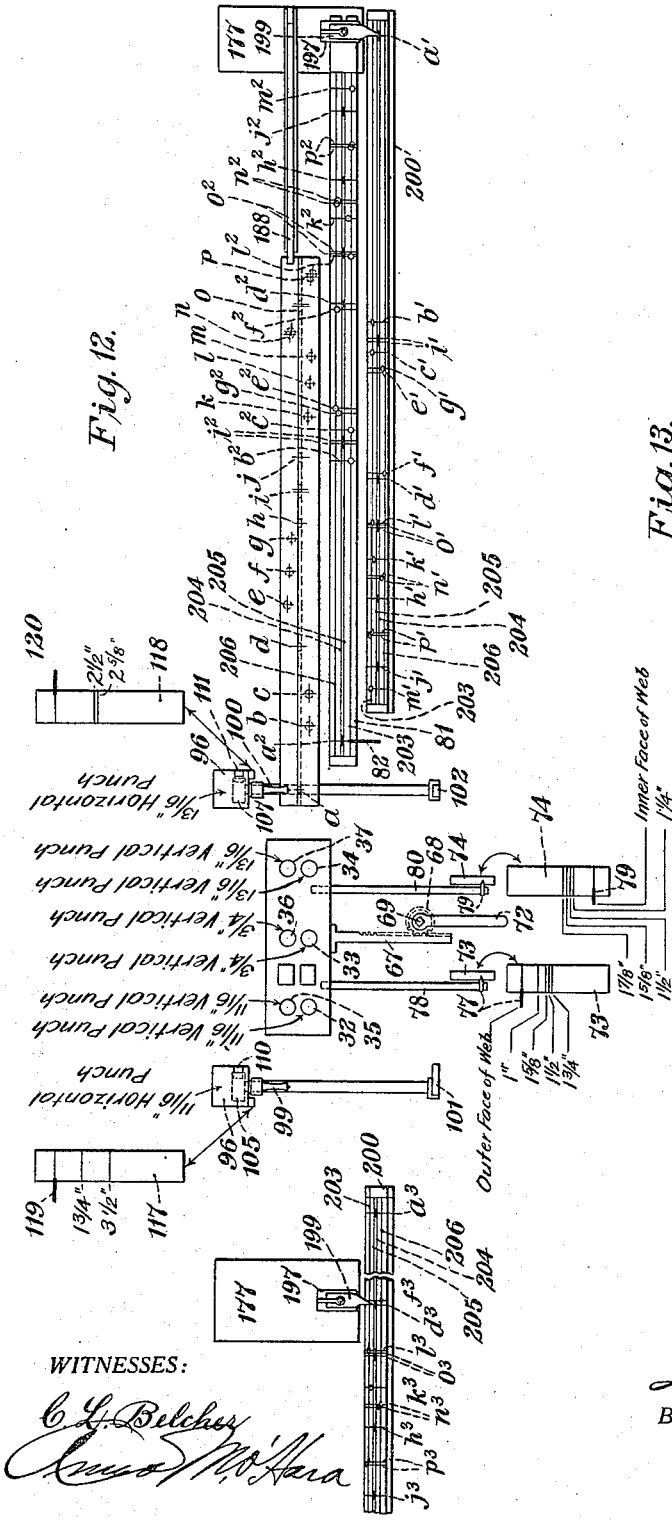
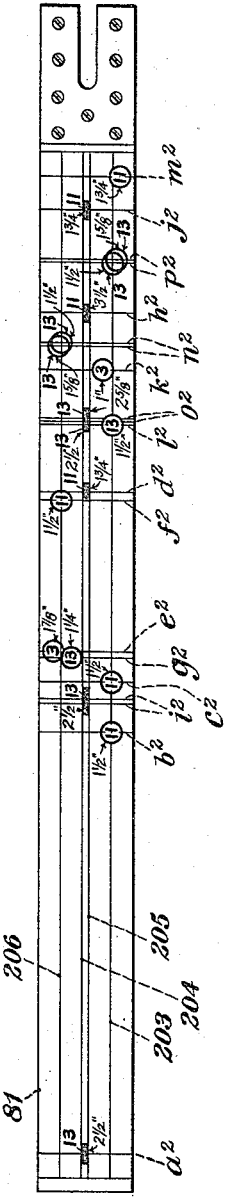

UNITED STATES PATENT OFFICE.

FREDERICK A. STEVENSON, OF DETROIT, MICHIGAN, ASSIGNOR TO AMERICAN CAR AND FOUNDRY COMPANY, OF ST. LOUIS, MISSOURI, A CORPORATION OF NEW JERSEY.

PUNCHING-MACHINE.

1,164,028.  Specification of Letters Patent.  Patented Dec. 14, 1915.

Application filed February 10, 1914. Serial No. 817,800.

*To all whom it may concern:*

Be it known that I, FREDERICK A. STEVENSON, residing at Detroit, Wayne county, Michigan, and being a citizen of the United States, have invented certain new and useful Improvements in Punching-Machines, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a rear elevation of one-half of the machine comprising the present invention as viewed from the helper's position, a large portion of the track being omitted because of its great length. The other half of the machine is similar in construction to the half shown. Fig. 2 is a plan view of the structure shown in Fig. 1. Fig. 3 is a front elevation of the central portion of the device, as viewed from the operator's position, showing the punch fixture located upon the anvil of the punch proper, and with the top plate of the fixture affixed to the slide, short portions of the track extending in either direction. Fig. 4 is a vertical section along the line 4—4 of Fig. 3, the arrows denoting the direction of vision. Fig. 5 is another vertical section but along the line 5—5 of Fig. 3, looking in the same direction. Fig. 6 is a horizontal section along the line 6—6 of Fig. 4, looking in the direction of the arrows. Fig. 7 is a horizontal section along the line 7—7 of Fig. 4. Fig. 8 is a vertical section along the line 8—8 of Fig. 4, showing the horizontal gag and its associated parts, and, also the common pivotal part for the three toggle members which constitute the actuating means for the horizontal punches. Fig. 9 is a detail view of the gag handle associated with one row of the vertical punches, the gag handle for the other vertical row being entirely similar to the one illustrated. Fig. 10 is a detail view of the gag handle for controlling the horizontal punches. Fig. 11 is an enlarged vertical section through the track structure along the line 11—11 of Fig. 1. Fig. 12 is a diagrammatic view provided for the purpose of clearly disclosing the method of controlling the punching of a Z-bar, and Fig. 13 is a plan view of the traveling templet.

The present invention pertains to the punching treatment of structural shapes or their equivalents, with its adaptability to perforating Z-bars being enlarged upon. Heretofore the punching of such shapes has necessitated several passages of the structural bar in question through one or more machines; for instance, in the case of the Z-bar it has been necessary to pass the said bar through a punching machine to produce the holes in the top flange. In order to place the holes in the web the bar would necessarily have to be run through another punching machine or else the punches would have to be changed in the machine used and the bar run through it a second time. This was then followed by a third such passage to take care of the holes in the bottom flange.

One object of my invention is to eliminate this multiplicity of handling of said bar and that upon the passage of the bar through the machine embodying my invention all the punching work pertaining thereto will have been accomplished. In the prior practice, it was the custom to mark the positions of the holes on the various elements of the bar, *i. e.*, the top flange, web and bottom flange, but this extra labor has been also done away with and improved accuracy has been attained. This improved accuracy is of inestimable value when the Z-bar is assembled with its associated parts reducing, as it does, the necessity for reaming out inaccurately spaced holes.

The device is simple in construction, easy to manipulate and unlikely to get out of order and with the very considerable saving of time, improved accuracy and with the increased output which it gives, has been found to be a valuable addition to such shop equipments as are intended for the punching of the structural shapes.

In the drawings, 1 indicates the body of an ordinary deep throat punch and 2 the head thereof, within which head is a slide or plunger 3. To the bottom of this slide 3 is secured, by means of bolts 4, positioned in T-slots 5 in the slide, a top plate 6, which not only serves as a housing for certain parts, to be described, but provides the supporting means therefor. This top plate 6 has depending side walls 7, projecting inwardly for a short distance from the inside of which are horizontal ledges 8, parallel to said side walls, and extending from a point substantially central of the side walls outwardly toward the front of the machine. The top and side walls of the top plate 6, within the limits of the length of the ledges 8, are slightly thicker than their normal dimensions to permit the machining of the interior of these walls as well as the ledges, finished grooves 9 being thus provided for the reception of tongues 10 integral with the forward or outer punch block 11.

The punch block 11 has an end wall 12, side walls 13 and a base plate 14, as best shown in Figs. 5 and 6. The intersection of the end wall 12 with the base plate 14 is reinforced by additional metal throughout the width of the forward punch block 11, as shown at 15, creating a rugged construction capable of easily sustaining the stresses incident to the punching operations. Suitable vertical holes containing punch stems 16, 17 and 18 are drilled through the portion 15, and, in the present instance, are shown to be three in number, disposed, one at the center, with another equidistantly located each side of the first mentioned stem. The heads of the punch stems are of somewhat larger diameter than the stems proper, are of relatively small height, and normally reside in elongated depressions 19, 20 and 21. These depressions contain, respectively, oblong apertures 22, 23 and 24, through which pass square headed bolts 25, 26 and 27, the width of the heads corresponding to the width of the depressions 19, 20 and 21, and the heads having an altitude equal to the depth of said depressions. These bolts serve to clamp the back or inner punch block 28 to the forward or outer punch block 11, thereby, during the ordinary operation of the machine, causing both punch blocks to slide as though they were integral.

The punch stems 29, 30 and 31 of the back vertical punches pass through drilled holes in the back punch block 28, and their heads, as in the case of the forward punch stems, occupy positions in the elongated depressions 19, 20 and 21, and, also as before, the heads are flush with the top of the base plate 14. At the lower end of all the vertical punch stems referred to are the punches proper, 32, 33 and 34, being, respectively, associated with stems 16, 17 and 18 and 35, 36 and 37, being attached to the stems, 29, 30 and 31. Nuts 38 are employed to secure the punches to their stems in each instance.

Inspection of the back vertical punch stem 30, in Fig. 5, discloses an intervening extension piece 39. Such an extension is provided for each of the punch stems 29, 30 and 31. Its purpose is to bring the cutting or shearing edge of the punch with which it is allied, as punch 36 of Fig. 5, to the proper height above the bottom flange of the Z-bar, so that the fixed thrust of the slide 3 is sufficient to carry said punch downwardly the requisite distance into its corresponding die.

The top of die 56 for punch 36, Fig. 5, is flush with the top of the back die block, but, when, upon occasion, such a die as 53, in the forward die block 58, is employed, its upper surface extends above the top plane of the back die block 59 a distance equal to that which the punch 36 has been lowered by the introduction of extension 39. In this case said extension is omitted, the punch being directly attached to the punch stem and the distance between the cutting or shearing edge of punch 36, for instance, and the top of the upwardly projecting die is the same as when the entirely embedded die and the extension were used.

Referring to Fig. 5, it will be noted that a certain amount of space exists between the top of the punch stem heads and the underside of the top plate 6. By reason of this clearance, none of the vertical punches will operate to produce holes in the work unless this clearance is neutralized in the manner now to be set forth.

Figs. 4 and 6 best show similar apertures 40 in both side walls 7 of the top plate 6, through which extend gag handles 41 and 42, both handles having the same construction, as both the forward and back rows of punches are similarly arranged in a direction longitudinal of the machine. One of these duplicate gag handles is shown in Fig. 9. To the gag handle pertaining to the forward row of punches, is fastened, by means of screws, a gag 43, and to the handle associated with the back row of punches is screwed another gag 44. The underside of each gag handle is notched as at 45, 46, 47, 48 and 49, to engage, one or the other, of a pair of spring detents 50 and 51. By this means, any of the vertical punches may be selected to operate upon the work, or, if no vertical punch is desired they may all be rendered inoperative. For example, let gag handle 41, and its gag 43, be considered in connection with punch stems 16, 17 and 18, which carry the forward row of punches (see Figs. 3 to 7).

Fig. 6 shows the gag handle in that position where notch 45 is in engagement with detent 50, thereby bringing gag 43 over punch stem 16. The gag then fills the gap between the top of the punch stem 16 and the underside of the top plate 6, and, when the latter is forced down by slide 3, a hole is punched.

A more perfect comprehension will be obtained by referring to Fig. 5, wherein the gap referred to, but which, in this case, is shown as existing between the top of punch stem 17 and the underside of top plate 6, is clearly illustrated. And, furthermore, while the gag 43 does not appear in this plane, because of its being shown over punch stem 16 in another view, it has been indicated in dot and dash lines to bring out the fact that its altitude is such as to substantially fill the gap between the underside of the top plate and top of the punch stem in question. Gag 43 when brought over punch 17 by an outward pull of gag handle 41 ceases its travel when notch 46 engages spring detent 50, the resultant vibration due to the snapping of spring 50 into notch 46, notifying the operator of this accomplishment. Had it been desired to utilize punch 34, the gag handle 41, would have been pulled outwardly until notch 49 engaged spring detent 51, which would have brought gag 43 over the punch stem 18, filling the gap between the top of said punch stem and the underside of top plate 6. Upon the downward thrust of slide 3, carrying the top plate with it, punch 34 would produce a hole of predetermined diameter in the top flange of the Z-bar.

Notch 47, when it engages spring detent 50, causes the gag 43 to be placed midway between punch stems 16 and 17. It therefore is not in a position to affect any punch stem and its punch, and no hole in the top flange of the Z-bar will be produced. In other words, while punch 33 and its stem 17 for example, shown in Fig. 5, will be carried down by gravity with the forward punch block 11, when the top plate 6 carries the latter down, the lower extremity of the punch will come to rest upon the upper surface of the top flange of the Z-bar, and will proceed downwardly no farther. The downward movement of the top plate 6 will not have been completed at this point, and will continue somewhat farther, but not sufficiently for the underside of said top plate to engage the top of punch stem 17. Had the gag 43 been introduced over the top of the punch stem 17, the latter's punch could have possessed no alternative to continuing downwardly through the top flange of the Z-bar and into its die 53. The downward impulse received from slide 3, is transmitted to the top plate 6, to gag 43, punch stem 17, and its punch 33, the latter coming to rest after its proper entry into the die 53, as may be appreciated by inspecting Fig. 5.

Notch 48, engaging spring detent 51, results in placing gag 43 midway between punch stems 17 and 18, and again no punch in the forward row of vertical punches is operated. The control of punch stems 29, 30 and 31, and their respective punches, by gag handle 42 and gag 44, is the same as that just described for the forward row of vertical punches.

The dies are designated by numerals 52, 53 and 54 for the forward row of punches and 55, 56 and 57 for the back row, the former set being located in the forward die block 58, and the latter set in the back die block 59. Forward die block 58 rests upon the back die block 59, and is clamped thereto by flat headed bolts 60, the heads being accommodated in elongated recesses, as shown at 61, and the shanks passing through slots 62, both recesses and slots being in the back die block, as clearly shown in Fig. 5. Back die block 59 is provided with tongues 63, which slide in grooves 64 formed by ledges 65, projecting from the interior side walls of the base casting 66, the interior side walls themselves, and the upper surface of the base plate of the base casting.

Having now set forth that the forward and back punch blocks are bolted together and slide, in effect, as a unit, when moved, carrying with them the punches, gags, and the latter's handles, and further, that the forward and back die blocks are bolted together, thus also moving in unison, it remains to be made clear how the axes of the punches are maintained in vertical alinement with the axes of their respective dies, as they are shifted transversely, from time to time, across the bar to be punched, in accordance with the various transverse locations of the holes to be successively produced. To the forward punch block 11, located in the top plate 6, is attached, by means of tap bolts, or other suitable means, a rack 67, which meshes with a pinion 68, located in a recess in the outer end of the top plate 6. This pinion has a square central hole, that fits about a squared vertical shaft 69, toward its upper end. Farther down upon said squared shaft, and resting in a recess in the outer end of the base casting 66 is a pinion 70, like pinion 68, and which meshes with a rack 71, having the same tooth arrangement as rack 67, and which, furthermore, is attached to the forward die block. A lever 72 is clamped about the vertical shaft 69, just above the base casting at its outer central point. Movement of this lever 72, rotates shaft 69, and with it the pinions 68 and 70, thereby actuating the racks 67 and 71 to move the punch blocks, and their respective die blocks, simultaneously, inwardly or outwardly, according to the direction of movement of lever 72. That the operator may know exactly the amount the vertical punches and their dies have moved transversely over the Z-bar, and, moreover, the exact transverse point at which any given hole will be punched in said bar, two templets 73 and 74 are provided, supported by suitable brackets 75 and 76, the latter being bolted to the front face of the base casting 66. Templet 73 has graduations upon it by which the transverse locations of the forward row of punches, which punches are designed to produce the holes in the top flange of the Z-bar, can be determined. Coöperating with this templet is a pointer 77, attached to a rod 78, the inner end of this rod being secured to the back die block 59. Thus, when the die blocks slide inwardly or outwardly, the change of position is indicated by the pointer 77, moving over templet 73. This templet is intended to refer to the punches for the top flange of the Z-bar. When it is necessary to know over what transverse point of the bottom flange the punches allotted to producing holes in this portion of the Z-bar are, the graduations on templet 74 are referred to. The pointer 79, attached to rod 80, which in turn is secured to the forward die block 58, and moves with it, will disclose the position on templet 74. By actuating the vertical shaft operating lever 72, the punch blocks and the die blocks will be caused to move, a corresponding movement of the pointers 77 and 79 over the templets 73 and 74 will result, and according to which templet is being considered, its pointer may be brought to rest over any particular graduation, whereupon the operator knows that he has properly located in a transverse direction the punch to be used.

The operator has previously secured his directions, by which to transversely set the punch giving the desired diameter of the hole, from a traveling templet 81. Such a templet is shown in Fig. 13, but will not be fully described at this point, though it may be well to call attention to its indicator 82, which is secured to the right hand side of the base casting 66, as viewed from the operator's position, i. e., as in Figs. 3, 4 and 5.

The slugs, which result from punching the top flange, find their egress through the holes in dies 52, 53 and 54, as best shown at 53, Fig. 5, through passages 83 in the forward die block 58, slots 62 in the back die block, and slots 84 in the base casting 66, from whence they fall either to the floor or into a box (not shown) placed so as to receive them. Slugs punched from the bottom flange of the Z-bar, pass through dies 55, 56 and 57, as best shown at 56, Fig. 5, passages 85 in the back die block, passages 84 in the already mentioned base casting, and thence out as before stated.

Wipers or strippers 86, disposed transversely of the Z-bar, and fastened at each end by tap bolts to the casting base 66 serve with the aid of the die devices comprising stems of horizontal block 114 and die 53 to guide and to maintain the Z-bar in its proper position with relation to the punches, and prevents transverse movement of said Z-bar whenever a punch is being withdrawn from the said bar.

The forward row of punches being for performing work upon the top flange, and the back row for the same purposes with reference to the bottom flange, it becomes necessary to show in what manner the holes in the web of the Z-bar are obtained.

At each side of the base casting 66, from approximately its transverse center, and extending rearwardly are two vertical walls 87 and 88, 87 being the outer wall and 88 the inner. Within each recess formed by these walls is a horizontal head 89, which slides upon a horizontal machined surface 90 of the base casting 66, as seen in Fig. 4. The surfaces of the side walls 87 and 88 that are in juxtaposition to the horizontal head are also machined to present suitably smoothed faces to the sides of the said horizontal head, while ledges 91, (see Figs. 4, 5 and 7), restrain the horizontal head from vertical movement. This horizontal head 89 toward its rear is hollowed out, as at 92, Fig. 4, resulting in a construction which includes outer side walls 93, the thickness of these walls corresponding to the width of the ledges 91, which overhang them. This is most clearly brought out in the lower part of Fig. 7, where a portion of one ledge 91 is broken away. The portion intermediate the side walls 93 is L-shaped in section, and its front face is drilled for the reception of screws, by which the backing plate for the horizontal punch stem is secured to said front face of the horizontal head 89. Side walls 93 project forwardly of the front face of the horizontal head just referred to, and have formed near their forward extremities vertical ribs 95, suitably machined, and which are rectangular in cross section. Corresponding vertical grooves in the sides of the horizontal punch blocks 96 receive the ribs 95, and, when the horizontal heads 89 slide in or out, as will later be set forth, carry with them the said punch blocks.

Punch blocks 96, one provided with horizontal punch stem 97 and the other with stem 98, (see Figs. 4 and 7) to the ends of which are attached, respectively, horizontal punches 99 and 100, are capable of vertical movement, being guided by the ribs 95. The object of such vertical movement of the horizontal punch blocks 96 is to raise or lower, from the position on the web of the Z-bar at which the last hole was punched, the punch next to be used, provided the next hole is not to be at the same altitude as the last. Means for accomplishing this consist of levers 101 and 102, (see particularly Fig. 4), attached to horizontal shafts 103 and 104, which shafts are for the major portions of their length square in cross section, and upon the squared portions carry pinions 105 and 106 on shaft 103, and 107 and 108, on shaft 104. Disks 109 are riveted to both sides of each pinion 105, 106, 107 and 108, and projecting between the disks attached to pinions 105 and 107 are vertically disposed racks 110 and 111, the former meshing with pinion 105, and the latter with pinion 107. The upper ends of racks 110 and 111 are attached to their respective horizontal punch blocks 96. Pinions 106 and 108 also are provided with racks 112 and 113, respectively, which at their upper ends, are attached to horizontal die blocks 114. When either lever 101 or 102 is actuated, its shaft 103 or 104, as the case may be, is rotated, and with it its pinions 105 and 106 or 107 and 108, which propel racks 110 and 112 or 111 and 113, thereby raising or lowering in unison according to the direction of rotation of the lever 101 or 102, the horizontal punch block 96 and the horizontal die block 114 associated with the lever moved.

Referring briefly to Fig. 4, let it be assumed that lever 101 is rotated. Shaft 103 is rotated by it, as are pinions 105 and 106 and responding to the action of these latter racks 110 and 112 move up or down, according to the direction of movement of lever 101. As the racks are attached to the horizontal punch block 96 and the horizontal die block 114, they of course, move in unison, and the punch 99 and its die 115 assume a different altitude on their respective sides of the Z-bar. Punch 100 and its die 116 are controlled in the same manner. It should, of course, be borne in mind that levers 101 and 102 do not determine whether a punch is to be operated or not, but simply provide means for securing the proper altitude for the punch that is to be next used. A horizontal gag must be manipulated before any punching can be done.

It is obvious that the operator should know when he has secured the proper altitude for the punch he intends to use. To this end, templets 117 and 118 are attached, one to each horizontal punch block, and consequently rises and falls with it. A stationary pointer 119 is secured to one of a pair of wipers 121, and coöperates with graduations on templet 117, as the latter slides behind it, to permit the operator to bring any given graduation opposite the said pointer. When this has been done, the operator knows he has given the correct altitude to the punch 99 and its die 115 for the hole he intends to produce in the web of the Z-bar. Similarly, a stationary pointer 120 is attached to one of the other pair of wipers 122, the latter being duplicates of wipers 121, and is related to templet 118 which is associated with horizontal punch 100 and its die 116, and is attached to the horizontal punch block 96 which carries the punch 100. As in the case of the first mentioned horizontal punch, the templet 118 and its pointer 120 guide the operator in his attaining the proper altitude for punch 100.

Wipers 121 and 122 serve to maintain the Z-bar in its correct transverse position, particularly when either punch 99 or 100 is withdrawn from the Z-bar after punching a hole. These wipers 121 and 122 are bolted to inner and outer vertical walls 87 and 88 on each side of the base casting 66.

The horizontal heads 89, together with the punch blocks 96, their respective punch stems and punches move outwardly toward the Z-bar when the slide 3 travels downwardly, and retreat from said bar when the said slide moves upwardly on its return stroke.

The racks 110 and 111, as either one or the other is brought into forward or backward motion, by the moving of the punch block to which it is attached, engage the forward or back disks 109 of pinion 105 or 107, in accordance with whether the movement of the punch is forward or backward. The disk thus engaged carries its pinion in the same direction along the squared shaft and at the same speed as the punch block that carries the rack in question, and, hence, the rack and pinions associated never become disengaged by the rack moving away from the pinion. (See Figs. 4 and 7.) Depending also from each of the horizontal punch blocks 96, and located directly opposite the racks 110 and 111 are pinion guides 125 and 126, indicated in Fig. 7, of the same formation as racks 110 and 111, except that they are not provided with teeth and do not mesh with the pinions. Their function is to assist in sliding their respective pinions upon the squared shafts.

The pinions 105 and 107 partially occupy apertures 123 and 124, and their racks 110 and 111 also project downwardly into these openings, and each bears against one of the sides of the opening which contains it. Likewise, pinions 106 and 108 partially occupy somewhat similar openings 127 and 128. These last mentioned openings are not as long as openings 123 and 124 because pinions 106 and 108 do not slide along the horizontal squared shafts 103 and 104, the horizontal die blocks 114 being capable of only vertical adjustment.

Returning to the consideration of the horizontal heads 89, (see Figs. 4 and 7), each possesses a concave seat 129, into which fits the cylindrically formed ends of a toggle member 130. Its opposite arcuated end bears against a horizontally disposed cylindrical pivot member 131. Another toggle member 132 has its arcuated end bearing on the opposite side of said pivot member, with its cylindrically formed end resting in a concave seat 133 in the rear vertical wall of the base casting 66. A third toggle member 134, with its concave end bearing upon the top of the pivot member 131, and the outstanding projection of its upper cylindrical end having their lower halves embraced on the outside by the lower ends of loops 135, which depend from approximately V-shaped projections outstanding at and from the rear of the top plate 6, and on the inside by similar loops 136, depending from the side walls 7 of the top plate 6, as shown in Figs. 3, 4, 5, 6 and 8.

Toggle members 130 at their cylindrical ends, which bear against seats 129 in horizontal heads 89, are of the same width as the distance between the side walls 93 of said heads. To operatively connect these to the horizontal heads 89, extensions 137, of the same diameter as the cylindrical end of the toggle members, and each provided with a short portion of reduced diameter, are fitted into recesses in the cylindrical ends of the toggle members 130, said recesses being of the same diameter as the reduced portion of the toggle extensions 137. Like toggle member extensions 137 are attached to each cylindrical end of each other toggle member, but in members 134 only one is employed in each. Fig. 8 is calculated to best show the extensions fitted into the cylindrical ends of the toggle members.

As will be noted, bolts 138 pass through the cylindrical ends of the toggle members and through the cylindrical extensions and clamp them together, except in the case of the cylindrical end of toggle members 130. Here the inner and outer side walls 87 and 88 of the base casting, save for sliding clearance, are in contact with the side walls 93 of the horizontal heads, with the exterior of which walls 93 the outside end of the toggle member extensions 137 are flush. Therefore, pins 138ᵃ instead of bolts are employed, the walls 87 and 88 preventing them from becoming dislodged. The apertures in loops 135 and 136 are prolonged upwardly, and, in reality, become part of chambers 139 within the top plate projections 140. Located in these chambers, and resting upon the upper cylindrical ends of toggle members 134 are toggle bearings 141.

Figs. 4 and 8 show a considerable clearance between the top of the toggle bearings and the tops of chambers 139. It is great enough to avoid pushing down the toggle bearings 141 and toggle members 134, when the top plate 6 is carried down by the slide 3, unless the horizontal gag is interposed between the underside of the top wall of one chamber, or the other, and the top of the toggle bearings within that chamber. When, however, such interposition of the horizontal gag 142 is made in one chamber, a downward impulse received from the slide 3 will be imparted through the top plate 6, to the horizontal gag 142, to the toggle bearing 141, and to the vertical toggle member 134. The latter in moving downwardly forces down the toggle pivot member 131, and this results in the downward rotation of toggle members 132 and 130. As toggle 132 is seated in the base casting 66, it cannot retreat, but toggle member 130 can, and, as both of these members approach a horizontal position, the member 130 forces the horizontal head 89 outwardly, the latter carrying with it the horizontal punch block, its stem and punch, as 99, which is forced through the web of the Z-bar and into the horizontal die 115, all as clearly shown in Figs. 4 and 7.

The slugs from the web of the Z-bar after emerging from the horizontal dies, travel through passages 143 in the horizontal die blocks 114, and passages 144 in the base casting 66, and thence out of the punch fixture into a box (not shown) placed where they will fall into it.

Considering the toggle pivot members 131, as disclosed in Figs. 4 and 8, it will be observed that each consists of a horizontal cylindrical portion with an annular flange 145 at one end in which flange is an annular groove 146. At the opposite end it is drilled and threaded to receive a threaded lug which is integral with an annular cap 147, which cap is of the same diameter and thickness as flange 145, and contains an annular groove 148.

The arcuated ends of the toggle members 130, 132 and 134, are of greater width than the main portions of said members, forming curved projections on each side of each toggle member. The thickness of these projections correspond to the width of the annular grooves 146 and 148, and they project into these grooves, and, hence, all the toggle members are securely maintained in their proper relationship at this common central pivotal point.

Neither horizontal punch can be operated until the horizontal gag 142 is inserted between the underside of one or the other chamber 139 and the toggle bearing 141 within that chamber. The horizontal gag is supported midway between its extremities by a bracket 149 screwed to the back wall of the top plate 6. Looking at this gag in Fig. 8, it will be seen, that while this bracket is relatively narrow, the gag cannot rock upon it, for, in the position shown, the upper left and right hand corners prohibit any rotary action of the gag by contacting with the undersides of chambers 139. Whenever it is moved to one side, or the other, the end approaching a chamber 139 will have inserted itself between the underside of the chamber and the top of the toggle bearing within said chamber, before the opposite end of the gag has cleared the underside of the other chamber 139. Thus the horizontal gag always occupies its horizontal plane. The central part of the surface of the horizontal gag is recessed, and in this recessed portion is drilled a hole to receive a pin 150 riveted to a shifting bar 151. The end of the shifting bar opposite the pin 150 is bolted to the horizontal gag handle 152.

The gag handle is shown in detail in Fig. 10, and is notched on its underside at 153, 154 and 155. It passes through apertures 156 in each side wall 7 of the top plate 6, beneath which are secured spring detent 157 on one side, and 158 on the other. When in the position shown in Fig. 6, notch 153 in the horizontal gag handle engages spring detent 157, and the horizontal gag is in its off position, i. e., it is not over either toggle bearing 141. But when the handle 152 is pulled out so that notch 154 engages spring detent 157, the horizontal gag is moved to the right, in Fig. 8, and from Figs. 4, 6 and 7 it will be seen that horizontal punch 100 will be actuated as soon as the top plate 6 receives its impulse from slide 3. On the other hand, when notch 155 in the horizontal gag handle is brought into engagement with spring detent 158, the horizontal gag 142 will move toward the left, in Fig. 8, and inspection of Figs. 4, 6 and 7 will make it plain that horizontal punch 99 will be caused to produce a hole in the web of the Z-bar when the top plate 6 is impelled downwardly.

The base casting 66 has horizontal flanges 159, at the bottom of its sides, through which pass bolts 160 (see Fig. 3) which continue through projections 161 from the anvil 162 of the deep throat punch 1. Bolts 160 also continue through horizontal flanges of connection castings 163, rigidly binding the base casting 66, and the connection castings 163 to the deep throat punch 1, through the projections 161 of the anvil 162. Connection castings 163 are provided with vertical outstanding flanges 164, to which are bolted commercially rolled channels 165 and 166. The channels constitute tracks, are best discerned in Figs. 1, 2 and 11, and are supported throughout their lengths by standards 167, the latter preferably being equidistantly spaced apart.

As will be seen in Fig. 11, the points of attachment of the track channels 165 and 166 to the standards 167 is at the sides and near the top of such standards, where said sides project outwardly and assume a contour corresponding to the configuration of those sides of the channels which abut the sides of the standards. The projections thus formed are designated by numeral 168. The sides of the standards 167 continue upwardly, above projections 168, and form bearing heads 169, each containing three bearing pockets located at varying altitudes. Between these bearing heads, with their shaft whose ends rest in one pair of pockets, which pair being determined by the size of the Z-bar to be punched, are bar rollers 170, upon which the Z-bar rolls toward the punch fixture, when propelled by a carriage to be hereinafter referred to.

To the track channel 166 is bolted a rack 171, equal in length to said channel. In practice, this rack will consist of sections of such length that they may be conveniently cast in molds, and when assembled will be placed end to end until, in effect, they create a rack, which will equal in length the track channel 166. Meshing with the rack 171 is a pinion 172, mounted upon a shaft 173, on the outer end of which shaft is keyed a hand wheel 174. The shaft 173 is supported in a bearing 175, which is integral with the side wall 176 of the carriage 177. This carriage has a top plate 178, and another side wall 179. See particularly Fig. 11.

Each side wall 176 and 179 has three inwardly projecting bosses, serving as bearings for short shafts 180 and 181. As perceived from Figs. 1 and 11, the shafts 180 carry carriage rollers 182 which ride upon the top flanges of the track channels 165 and 166, while shafts 181 carry carriage rollers 183, which ride underneath the bottom flange of the track channels, and restrain the carriage 177 from any chance vertical displacement. Lateral disarrangement is prevented by the annular flanges each carriage roller possesses.

The bar rollers are spaced apart by distance pieces 184, and consequently the annular flanges on these rollers 170 project slightly above the bottom flange of the Z-bar, and the latter is laterally restrained thereby.

Pivotally attached to a lug 185 on the carriage top plate 178, are two parallel arms 186, (see Figs. 1 and 2) of rectangular cross section, which, extending toward the deep throat punch 1, continue from their pivotal connection to lug 185 beyond the end of the carriage which is opposite to that possessing said lug, where their ends are downwardly turned and connected by a pivot pin 187. Supported pivotally from the last mentioned pin is an upper jaw lever 188, and a lower jaw lever 189. The short arms of these levers constitute the jaws which grip the bottom flange of the Z-bar 190. The long arm of upper jaw lever 188 extends backwardly, between the parallel supporting arms 186 and at its extremity is bifurcated to receive an eccentric 191, which is pivoted within said bifurcation, and has attached to it an operating handle 192. The long arm of the lower jaw lever 189 also extends backwardly, its extremity carrying a threaded stud 193, vertically disposed, and carries a cylindrical nut or barrel 194, upon the top of which bears the lowermost part of the eccentric carried in the bifurcated end of the long arm of the upper jaw lever 188. The nut 194 permits of a refined adjustment of the vertical distance between the long arm ends of upper and lower jaw levers, so that, when the eccentric is pressing upon the top of said nut, the gripping power of the short or jaw ends of said levers will be maintained at a high efficiency.

Top plate 178 of the carriage has an opening 195, extending inwardly from that end of the plate nearest the punch body 1, which is of sufficient dimensions to leave substantial clearance about the extremities of the long arms of the jaw levers, the eccentric, and the nut upon which it bears. And, in addition there is room for a spring 196, which is attached to the end of the long arm of the lower jaw lever 189, to extend upwardly, and over the top plate 178 of the carriage, its free end resting thereupon, between the supporting arms 186. This spring 196 aids in keeping the lower jaw lever 189 in a substantially horizontal position. The outer end of the short arm of this lever 189 is serrated to improve the gripping qualities of the jaws, and at the inner termination of the serrations is provided with a shoulder against which the Z-bar is set. On the top carriage plate 178, shown in Figs. 1, 2, 11, and 12, is a bracket 197 for supporting one end of the traveling templet 81.

Fig. 11 shows a bolt 198 with its head embedded in the under side of the traveling templet 81, its shank passing upwardly through said templet and the horizontal arm of the bracket 197, a nut on the upper threaded end of the bolt clamping the end of the traveling templet to its bracket. Bracket 197 on each carriage 177 also carries a pointer 199, which rides over the stationary templet 200, which parallels the path of movement of the carriage considered, there being two stationary templets 200, one each side of the punch body 1, two sets of tracks, and one traveling templet 81.

In said Figs. 1, 2 and 11, other brackets 201 are shown which are bolted to the side of the standards opposite that where the track rack 171 is located. Such brackets support the stationary templets, the latter being secured by ordinary wood screws to the former at their upper ends. These upper ends are virtually V-shaped pockets, each leg of the V being disposed at substantially 45° to the horizontal. The long leg of each V parallels the under surface of the stationary templet, and it is through this leg that the wood screws pass before entering the stationary templet. Brackets 201 support rollers 202, upon which the traveling templet 81 rolls in its passage toward and through the punch fixture attached to the anvil of the deep throat punch 1.

The various elements of the machine having now been described in detail, its operation will be outlined. Figs. 12 and 13 have been introduced principally to disclose the manner in which the operator and his helper secure their instructions for manipulating the parts respectively intrusted to the care of each. Inasmuch as the full sized machine is nearly 93 feet in length, and its traveling templet is but four inches wide, and the stationary templets, the Z-bar to be operated upon, etc., are correspondingly narrow, it will be readily appreciated that Fig. 12 must necessarily be distorted as to its dimensions to keep it within the limits prescribed for drawings to be filed in the United States Patent Office, therefore, such parts as are shown are merely symbolical and their true form and dimensions must be found from the other figures. However, the longitudinal spacing of the holes in the Z-bar, and of the transverse graduations on the traveling and stationary templets, as well as the longitudinal spacing between the various punches are properly illustrated.

With Fig. 12 as a key to the instructions for the operator and his helper, the remaining figures will permit the tracing of the various manipulations throughout the machine. The traveling templet 81 has had the proper end attached to its bracket 197 on the carriage 177. A commercially rolled Z-bar 190 is loaded with the aid of a crane, upon the bar rollers 170 and is shown at the right in Fig. 12. The carriage 177 located on this side of the machine, which had first been run nearly to the outer end of its track, is returned until the bottom flange of the Z-bar enters the then opened jaws of levers 188 and 189. The eccentric operating handle 192 is brought down between the jaw supporting arms 186, whereupon the eccentric or cam 191 has one of its greater radii disposed over the nut 194 on the lower jaw lever, and the Z-bar bottom flange is tightly gripped. Carriage 177 is moved forward or backward, as may be necessary to bring the graduation $a^2$ on the traveling templet in alinement with indicator 82, attached to the side of base casting 66. (See Figs. 3, 4 and 5). Now, while graduation $a^2$ on the traveling templet 81 is located at that end of said templet nearest the punch proper, the graduation $a^1$ on the stationary templet associated with this side of the machine, is at the end of said stationary templet 200 which is remote from the punch. In other words the templets are reversed with respect to each other.

Traveling templet 81, having been set to the graduation, ($a^2$), indicating the first hole to be punched, the stationary templet 200 referred to is slid along through the V-shaped pockets in the tops of its supporting brackets 201, until graduation $a^1$ on the said stationary templet comes opposite indicator 199. It is then screwed tightly in place to its supports and everything is ready to proceed with the punching of the Z-bar.

In Fig. 12 the distances between the transverse graduations, indicating the longitudinal spacing of the holes and slots in the Z-bar, and between the various punches, and, also the graduations on the other templets, are shown at a scale of one and one-half inches to the foot or on one-eighth scale. On the traveling templet as shown in Fig. 13, the scale is thirteen sixteenths of an inch to an inch.

Graduations $a^2$ and $a^1$ denote hole $a$ in the Z-bar, which is in the web, $2\frac{1}{2}$ inches above the undersurface of the bottom flange and one inch from the end of the bar. The operator knows hole $a$ is in the web, because the transverse graduations are intersected by four longitudinal lines 203, 204, 205, and 206, running nearly the entire length of the traveling templet. The central lines 204 and 205 denote the thickness of the web. Within these close parallel lines where graduation $a^2$ intersects them, is a solidly shaded rectangle. See Figs. 12 and 13 which denotes hole $a$ in the web. Graduations $a^2$ when brought under indicator 82, insure the longitudinal location of the proposed hole $a$ in the Z-bar being accurately alined with the punch which is to produce it.

The heavy faced numeral 13, (see Fig. 13), placed in proximity to the shaded rectangle, is the numerator of that fraction which denotes the size of punch required, the denominator being known to the operator through his association with the machine. The lack of necessity of lettering the entire fraction permits the numerals of the numerator to be of larger dimensions, and, consequently more easily read, which promotes rapidity in the operations. A light faced numeral is also discerned in proximity to the shaded rectangle. In this case it is a mixed number, though occasions may arise when it will be an integer or a fraction. In regard to the shaded rectangle on graduation $a^2$, its interpretation is: a thirteen sixteenths of an inch hole in the web, two and one-half inches above the undersurface of the bottom flange of the Z-bar, and one inch from the end of the bar. The longitudinal position of hole $a$ was, of course, located in initially setting the traveling and stationary templets discussed. The diameter of the hole is to be thirteen sixteenths of an inch, which requires the use of horizontal punch 100, whose center will be found to be one inch from the bar end in Fig. 12. To bring it to an altitude of two and one-half inches above the bottom of the Z-bar, lever 102 is rotated counter-clockwise, (see Figs. 7, 12 and also Fig. 4), whereupon shaft 104 and its pinions 107 and 108, rotate, the latter, through their racks 111 and 113, raising horizontal punch block 96 and horizontal die block 114. The operator is now observing templet 118, and, when the graduation denoting the two and one-half inches altitude comes opposite pointer 120, he holds lever 102 from further movement. But, before setting the punch and its die to the proper altitude he pulls out horizontal gag handle 152, (see Fig. 6), until its notch 154 engages spring detent 157. Thereby horizontal gag 142 is introduced between the underside of the chamber 139 and the toggle bearing 141 associated with punch 100.

Though Fig. 4 shows the other horizontal punch, examination of said figure in connection with Figs. 6 and 7, will give a clearer conception of what follows after the insertion of the horizontal gag in the horizontal punch mechanism under discussion. After horizontal gag 142 has been inserted, the operator causes the slide 3 to descend, by means not shown, but well understood in the art. Top plate 6 being carried down by the slide and the horizontal gag 142 filling the gap between the underside of chamber 139 and the top of the toggle bearing 141 associated with punch 100, toggle member 134 moves downwardly, forcing down toggle pivot member 131, straightening toggles 132 and 130. Thereupon the horizontal head 89 advances toward the web of the Z-bar, carrying with it the horizontal punch block 96, stem 98, and punch 100, the latter perforating the web and entering its die 116. As the slide makes its upward return stroke, the horizontal punch mechanism is returned to its former position, hole $a$ having been punched. The Z-bar is then advanced to the position for the next hole to be punched, the carriage 177 being advanced by turning its hand wheel 174, thereby rotating pinion 172. As the latter's rack 171 is stationary, being bolted to the track channel 166, the carriage advances, pushing the Z-bar and the traveling templet with it. This movement is continued until pointer 199, which rides over the stationary templet 200 comes over the graduation $b'$.

The graduations and other markings on the stationary templets, the one being considered, and also the one located on the opposite side of the punch 1, are identical with those on the traveling templet 81.

Movement of the carriage 177 is stopped, with its pointer over graduation $b'$ on the stationary templet and graduation $b^2$ on the traveling templet comes to rest under the latter's indicator 82.

At the intersection of graduation $b^2$ and line 203, which line indicates the top flange, is formed a circle inclosing heavy faced numeral 11. Fractional dimension one and one-half inches is associated with this circle and the reading is: an eleven-sixteenths of an inch hole to be punched in the top flange of the Z-bar, one and one-half inches in advance of the outer face of the web. The hole $b$ is four inches from hole $a$ but graduation $b^2$ is seventeen and three-eighths inches from graduation $a^2$. The discrepancy between the distances between the holes, and between the graduations representing the holes, is accounted for as follows: It is necessary to move the Z-bar a distance equal to the space between the hole last punched and the one next to be punched. If the same punch is to be used, this distance will be sufficient to space the next graduation on the traveling templet from the last but if another punch is to be employed, the distance from the punch last used to the one next to be used must be added in spacing the graduations on the traveling templet, to the distance between holes, if the punch next to be used is located at a point farther removed from the side of the punch fixture where the Z-bar first entered. If, however, the punch next to be used is nearer this said side of the punch fixture, the distance between the punch last used and the one next to be used must be subtracted from the distance between holes. That is, the distance between any two graduations is the algebraic sum of the positive distance between the holes and the positive or negative punch location compensation.

In the case illustrated in Fig. 12, the first punch used is the first punch encountered, and, as all the other punches are farther removed from this first punch, to the left of the side of the punch fixture where the Z-bar first enters, the distance between this punch, 100, and any other punch must be added to the distance between the hole first punched in the Z-bar and the distance therefrom to any subsequent hole punched in said bar. Hence, hole $a$ and hole $b$, being four inches apart, and the distance between the centers of punch 100 and punch 32, (the punch next to be used) being thirteen and three-eighths inches, the space between graduations $a^2$ and $b^2$, on the traveling templet, and between graduations $a'$ and $b'$ and $a^3$ and $b^3$, on the staticnary templet will be four inches plus thirteen and three-eighths inches equals seventeen and three-eighths inches. The Z-bar and the traveling templet having moved this distance, graduation $b^2$ is under indicator 82, and punch 32 is over the top flange at a distance four inches removed from hole $a$ in the Z-bar. The gag handle 41 is then positioned by the operator so that its notch 45 is in engagement with spring detent 50, when the gag 43 will be over punch stem 16. Looking at templet 73, the operator moves lever 72, turning the vertical squared shaft 69, and consequently its pinions 68 and 70, whereupon racks 67 and 71 are moved in or out, according to where the vertical punches were last stationed with reference to the desired transverse location of the hole now to be made, the direction of movement of lever 72 depending upon this condition. With the racks 67 and 71, move the forward and back punch blocks 11 and 28, and the forward and back die blocks 58 and 59, which the racks actuate. According to the reading on the traveling templet, the hole in this instance is one and one-half inches in advance of the outer face of the web. Therefore, lever 72 is kept in motion until pointer 77, carried by rod 78, which is secured to back die block 59, and consequently moves in unison with the vertical punches and their dies, comes over the graduation on templet 73 which notifies the operator that the centers of the forward row of vertical punches are one and one-half inches in advance of the outer face of the vertical web. The lever 72 is then held against further movement. With the downward movement of top place 6, punch stem 16 is carried down with its punch 32, the latter perforating the top flange and entering its die 52. It is withdrawn to its normal position upon the return upward stroke of slide 3, the top plate 6 being carried up by said slide.

The carriage 177 is advanced until its pointer 199 rides over the first of two allied graduations $i'$. Corresponding graduations $i^2$ on the traveling templet come beneath its indicator 82.

Now, the operator finds he is to punch a horizontal slot in the web of the Z-bar, which shall be thirteen-sixteenths of an inch wide, and as the two graduations $i^2$, are three-sixteenths of an inch apart, the slot will be one inch long. (When slots of greater length are desired, instead of two allied graduations, enough are grouped together to produce the desired length). The slot under consideration is to be two and one-half inches above the undersurface of the bottom flange, so the reading declares, and the first hole to be punched, in forming the slot, is found eighteen and one-half inches from the first hole punched in the Z-bar. Now, as the same punch that was used to punch the first hole is operated to produce this slot, there will be no punch location compensation, and the first graduation $i^2$ will be eighteen and one-half inches from graduation $a^2$ representing the first hole in the Z-bar. As the width of the slot is to be thirteen sixteenths of an inch, horizontal punch 100 is required. As its operation has already been described it will suffice to say that it is now operated, and that the carriage 177 is then advanced three-sixteenths of an inch, when it is operated again and the slot is completed. While slot $i$ is the third aperture punched in the Z-bar, it is the ninth aperture from the end of the bar first operated upon. This peculiarity is due to the varying locations of the punches, and simply means that slot $i$ came into alinement with its punch before hole $c$ did with its punch.

Movement of the carriage 177 is next continued until graduation $c'$ is met with by pointer 199 and the traveling templet graduation $c^2$ comes underneath the indicator 82. The hole $c$ is identical, in size and transverse location, with hole $b$, its longitudinal situation being the only variance, and, as this has just been treated upon, further discussion relating to it may be dismissed.

Proceeding onward, the pointer 199 on carriage 177 is brought into coincidence with graduation $g'$ on the stationary templet 200 over which it travels, and graduation $g^2$ on the traveling templet 81 alines with indicator 82, said traveling templet 81 having been simultaneously advanced with the Z-bar by carriage 177. The reading thus indicated on each templet, and as best disclosed on templet 81 shown in Fig. 13, is: A hole, thirteen-sixteenths of an inch in diameter is required in the bottom flange of the Z-bar, one and one-fourth inches back of the inner face of the web, and fifteen and one-half inches from hole $a$. The circles denoting hole $g$ on graduations $g'$, $g^3$ and $g^2$ are adjacent to lines 206 on the stationary and traveling templets, and lines 206 signify that holes placed in proximity to it are to be punched into the bottom flange. The reading calls for the use of vertical punch 37, in the back row of punches. The operation of the forward vertical punches has hereinbefore been described, and the operation of the back row is the same, except in that the gag handle 42 and its gag 44 are utilized, and, further, templet 74 is consulted instead of 73.

It may be well to again call attention to the disagreement of the consecutive locations of the holes in the Z-bar and the graduations upon the traveling and stationary templets. $g$ is the seventh hole in the bar, but graduations $g'$ and $g^2$, counting the pairs of graduations $i'$ and $i^2$ as single graduations, as they refer to a single aperture, are the fifth graduations on their respective templets. Operation is continued until the bar is punched for its required length.

The functions of the different elements, their forms, and relationships, and the manner in which they are operated, have all been clearly set forth.

In concluding this description, but one thing need have attention directed to it. It is customary, after propelling the Z-bar, and the traveling templet through the punch fixture to a point, where substantially half the work upon it has been performed, to permit the pointer on the carriage to remain at the last graduation it arrived at. The jaws are opened, releasing the bottom flange of the Z-bar, and the carriage on the track on the opposite side of the deep throat punch 1 is run up to the other end of the Z-bar, and its jaws caused to grip that end. Thus, in Fig. 12, when the pointer on the first used carriage reaches, for example, graduation $d'$, said carriage is detached, and the other carriage attached, whereupon, the pointer on the latter carriage will be at $d^3$, which designates the same hole in the Z-bar as does $d'$ on the first stationary templet.

The second stationary templet has been so longitudinally adjusted as to harmonize with the first. The second carriage then draws the Z-bar through the punch fixture until the said bar has had all its proposed holes and slots punched in it, and has been drawn sufficiently beyond the punch fixture to establish ample clearance. After it has been released from the second carriage, the Z-bar is lifted by another crane from off the bar rollers of the second track, and by said crane deposited with the Z-bars previously completed.

The specific details of construction and arrangement of the toggle members, their connections and associated parts will form the subject matter of a separate application for patent, hence, except as claimed herein in combination with other elements, no claim is herein made thereto.

What I claim is:—

1. In a punching machine, in combination, a plurality of vertically alined punches and dies, the former mounted in one block and the latter in another, both blocks being slidable transversely of a piece of work, means for feeding said work, an instruction and longitudinal spacing templet moving in unison with said work, an indicator for said templet, means for moving said blocks carrying said punches and dies, whereby when said work is moved in accordance with longitudinal spacings on said templet and said punches and dies moved in accordance with instructions on said templet, said punches and dies will be brought into coincidence with proposed apertures in said work, and means for operating said punches.

2. In a punching machine, in combination, a punch block and a die block, a plurality of vertically disposed punches and dies therein, both of said blocks being slidable transversely of the work, a plurality of horizontally disposed punches and dies, the former mounted in horizontally and vertically slidable punch blocks and the latter in vertically slidable die blocks, means for feeding work, a spacing templet caused to travel therewith, means for sliding said vertical punch and die blocks transversely of said work, which means, coacting with steps in the feeding of said work, position said vertical punches and dies to produce vertical apertures at predetermined points, means for operating said punch and die blocks carrying said horizontally disposed punches and dies to produce horizontal apertures in said work at any desired altitude therein in accordance with indications on said templet, and means for operating said punches.

3. In a punching machine, a main body frame, a base casting mounted thereon and a vertically reciprocatory top plate positioned thereabove, slidable on a vertical shaft and capable of actuating toggle mechanisms to operate one or more horizontal punches, slidable means mounted in said top plate carrying a group of vertical punches and other slidable means mounted in said base casting carrying dies for said punches, lever controlled rack and pinion devices for moving said vertical punches and dies transversely of a piece of work to a given lateral position, a plurality of vertically slidable horizontal punches and dies, lever controlled rack and pinion means for vertically positioning said horizontal punches and dies, carriages rolling on tracks and adapted to advance said work whereby given longitudinally spaced points in said work are brought into alinement with certain selected vertical or horizontal punches, means rendering said selected punches operable, and means for actuating said top plate to operate only said selected punches.

4. In a punching machine, in combination, a plurality of horizontally disposed punches and dies, mounted, respectively, in a vertically and horizontally slidable punch block and a vertically slidable die block, racks attached to each of said blocks, pinions mounted on horizontal shafts having non-circular portions and meshing with said racks, and operating levers on said shafts adapted to raise or lower both said punch and die blocks, means for advancing work through said machine, a traveling instruction and longitudinal spacing templet, means indicating predetermined steps of advance of said work and predetermined amounts of movement of said levers, both indicated on said templet, and means for operating said punches.

5. In a punching machine, in combination, a plurality of horizontally disposed punches mounted in punch blocks capable of sliding vertically and horizontally, slidable heads to which they are movably attached, vertically slidable die blocks, means for raising and lowering said punch and die blocks, means for advancing work through said machine and coöperating with the last mentioned means to position said punches and work to produce predetermined horizontal apertures in said work, and means for moving said horizontal heads to operate said punches.

6. In a punching machine, the combination of a plurality of vertical punches and dies mounted in punch and die blocks, selective means for rendering operable one or more of said punches, racks attached to said punches and die blocks and meshing with pinions on a vertical non-circular shaft, a lever attached to said shaft, the movement of which lever actuates said shaft, pinions, and racks to move said punches and dies transversely of said work, and means for operating the selected punches.

7. In a punching machine, in combination, a main body frame, a hollow base casting resting thereon, a hollow top plate positioned above said base casting, a hollow forward punch block comprising a base plate enlarged at one end, a plurality of depressions and slots in said base plate, a back punch block clamped to said forward punch block by bolts passing through said slots and with their heads lying in said depressions, a plurality of vertical headed punch stems some mounted to slide vertically in the enlarged end of said forward punch block and others to so slide in said back punch block, their heads normally lying in said depressions, punches attached to said stems, slidable gags in said forward punch block adapted to be interposed at will between said top plate and any of said punch stems, forward and back die blocks in said base casting, a plurality of dies in each, each die being in vertical alinement with one of said punches, means for sliding said forward and back punch blocks and die blocks in unison transversely of the work to any desired position, means for advancing said work through said machine in steps to bring positions of proposed apertures into alinement with the desired punch or punches, and means for thrusting said top plate downwardly to operate such punches.

8. In a punching machine, in combination, a main body frame, a hollow base casting resting thereon, a hollow top plate positioned above said base casting, clamped forward and back punch blocks slidable within said top plate, a plurality of vertical punches in both said punch blocks, selective means therefor, a plurally slotted and recessed back die block, a forward die block clamped thereto by bolts passing through said slots and with their heads located in said recesses, a plurality of dies in both forward and back die blocks, means for guiding and retaining work in place, means for sliding said punch blocks and die blocks in unison transversely of said work, means for advancing said work in predetermined steps through said machine, and means for thrusting downwardly said top plate to operate punches affected by said selective means.

9. In a punching machine, means for feeding work to bring the longitudinal positions of proposed apertures in said work into alinement with punches selected from a plurality of slidable punches, adapted to be adjusted in a vertical transverse direction across said work to produce horizontal apertures therein at desired altitudes, in combination with a hollow base casting having a rear wall and a pair of vertical walls at each side of said base casting parallel with but shorter than said sides, a slidable horizontal head retained between each pair of walls, a vertically adjustable punch block supporting a horizontal punch carried by said head, a vertically adjustable die block and die, a hollow top plate with an outstanding projection positioned above said vertical side walls, toggle mechanism comprising a plurality of legs bearing against a common central member and against the rear wall of said base casting, and against one of said heads and a toggle block in said projection, means for rendering said toggle mechanism effective, and means for downwardly moving said top plate to actuate said toggle mechanism to operate a punch.

10. In a punching machine, means for feeding work to bring the longitudinal positions of proposed apertures in said work into alinement with punches selected from a plurality of slidable punches, which punches are adapted to be adjusted in a vertical transverse direction across said work to produce horizontal apertures in said work at desired altitudes, in combination with die blocks and horizontally slidable punch blocks carrying punches, slidable horizontal heads carrying said punch blocks, a top plate with outstanding projections at one end, bearing loops formed in each projection, toggle mechanisms each comprising three similar legs arcuately flanged at their inner ends and which bear against a horizontally disposed cylindrically formed common pivotal member, means for locking said members in operative position, one member being located in one pair of said bearing loops and surmounted by a toggle bearing, another bearing adjacent said horizontal head, means for rendering one or more toggle mechanisms effective to operate its associated punch.

11. In a punching machine, the combination of a plurality of horizontal punches and dies and punch and die blocks, respectively, therefor, slidable horizontal heads carrying said punch blocks, all located in a hollow base casting, a hollow top plate with outstanding hollow projections at one end, the interior of the walls of each projection being shouldered at the inner and outer ends thereof forming an enlarged chamber therebetween, said inner and outer ends of said walls terminating in bearing loops, toggle mechanisms, one toggle member of each being located in the bearing loops of one projection, and other toggle members upon movement of the first being adapted to drive said horizontal punch forwardly, toggle bearings of less height than said chambers located one in each chamber and each toggle bearing acting upon one toggle member of said toggle mechanisms, a bracket attached to said top plate, a gag supported by said bracket and normally outside both chambers.

12. In a punching machine, means for feeding work to bring the longitudinal positions of proposed apertures in said work into alinement with punches selected from a plurality of slidable vertical and horizontal punches, vertical punches adapted to move laterally of said work to the transverse positions of proposed vertical apertures, and horizontal punches adapted to be vertically adjusted to the height of proposed horizontal apertures, in combination with a hollow base casting having a pair of vertical walls at each side thereof shorter than said sides, a slidable horizontal block carrying a punch located between each pair of said walls, horizontal die blocks having stem extensions containing dies, wipers attached to said vertical walls, a top plate positioned along said base casting, vertical punch blocks carrying a plurality of punches located in said top plate, forward and back vertical die blocks located in said base casting, a plurality of centrally located wipers between and parallel to said pairs of side walls, said wipers being attached to said base casting, said stems of said horizontal die blocks and said central wipers operating to restrain said work from lateral displacement, and said base casting and central wipers restraining same from vertical displacement.

13. In a punching machine, means for bringing the longitudinal positions of proposed apertures in said work into alinement with punches selected from a plurality of slidable punches, adapted to be adjusted in a vertical transverse direction across said work to produce horizontal apertures therein, the combination of a hollow base casting, a plurality of vertically adjustable punch and die blocks, provided, respectively, with punches and dies, supporting and propelling means for said punch blocks, vertically disposed racks attached to said punch and die blocks, pinions meshing therewith mounted upon partially squared shafts, disks secured to each side of each of said pinions and lapping their associated rack, the punch block racks being adapted to move their pinions along said shaft in unison with themselves, and said shafts being located in bearings in said base casting and in a plane below the bottom of said work, and said pinions and racks being partially pocketed in apertures in said base casting, operating levers for said shafts, and means for actuating said punch propelling means.

14. In a punching machine, the combination of a hollow top plate, a forward punch block slidable therein and a back punch block clamped to said forward punch block, vertical punches in each punch block, a hollow base casting, a back die-carrying die block slidable in said base casting, a die-carrying forward die block clamped to said back die block, said forward and back punch blocks, and also said forward and back die blocks being capable of adjustment whereby the distance between the punches and also the distance between said dies, may be increased or decreased, and means for operating said punches.

15. In a punching machine, the combination of a main body frame, tracks of channel shaped cross section extending away from opposite sides of said body frame, means attaching each track to said body frame, a plurality of standards supporting said tracks, each standard comprising a main vertically disposed casting having flanged sides, said sides near the top being shaped into projections conforming to the contour of the inside of said track channels and adapted to have the same bolted thereto, vertical projections above said side projections, and a top flange on said main casting depressed between said vertical projections, said vertical projections each containing a plurality of bearing pockets at varying heights, a roller supporting shaft spanning the space between said vertical projections and supported in bearing pockets of equal height in said vertical projections, a pair of flanged work-supporting and guiding rollers on said shaft, a distance piece spacing apart said rollers, a rack secured to one channel of each track, a rolling work-feeding carriage on each track, a manually operated pinion carried by each carriage and meshing with one of said racks, upon the operation of which pinion said work is advanced to be operated upon by said punches.

16. In a punching machine, means for feeding work to bring the longitudinal positions of proposed apertures in said work into alinement with punches selected from a plurality of slidable vertical and horizontal punches, said vertical punches being adapted to move laterally of said work to the transverse positions of proposed vertical apertures, and said horizontal punches being adapted to be vertically adjusted to the height of proposed horizontal apertures, and in which the punch operator is instructed from a traveling templet and a carriage manipulator by similar stationary templets, in combination with a main body frame channel shaped tracks extending away therefrom in opposite directions, standards supporting said tracks through integral projections fitting into said channels and to which said channels are secured, a rolling work-advancing carriage mounted on each oppositely extending track, means on one side of each track for propelling each carriage, upwardly extending brackets secured on said standards on the side opposite that on which said propelling means is located, said brackets attached to the standards for each track each supporting one of said stationary templets, roller shafts located above said carriages also supported by said brackets, rollers on said shafts for supporting said guiding traveling templet, and means for attaching said traveling templet to one or the other, or both of said carriages.

17. In a punching machine through which work is fed to bring the longitudinal positions of proposed holes in said work into alinement with punches selected from a plurality of slidable vertical and horizontal punches, the former adapted to move to the transverse positions of proposed vertical holes, and the latter adapted to be moved to the height of proposed horizontal apertures, the combination of a carriage on each side of said punches adapted to advance a traveling templet with said work, an indicator coacting with said traveling templet, a stationary templet each side of said punches, an indicator on each carriage coacting with its associated stationary templet, said traveling and stationary templets containing longitudinal spaced apart graduations, representing the longitudinal distances between proposed holes in a Z-bar plus or minus a distance due to the location of successively used punches, graphic representations of parts of said Z-bar, symbols at the intersection of said graduations and said graphic Z-bar parts representations denoting locations of holes in said Z-bar, distinguished characters in proximity to said symbols denoting size of punch to be used, and other characters denoting the transverse positions of holes in said top or bottom flange or altitudes of holes in said web, and means for operating selected punches.

18. In a punching machine through which a Z-bar is fed to bring the longitudinal positions of proposed holes in said Z-bar into alinement with punches selected from a plurality of slidable vertical punches, said vertical punches being adapted to move laterally of said Z-bar to the transverse positions of proposed holes in the top flange of said Z-bar, a top flange templet with scaled graduations thereon, an indicator therefor moved in unison with the transverse movement of said vertical punches whereby a certain punch or punches may be moved transversely of said top flange to said positions of proposed holes, means for rendering said certain punches operable and means for operating such punches.

19. In a punching machine through which a Z-bar is fed to bring the longitudinal positions of proposed holes in said Z-bar into alinement with punches selected from a plurality of slidable vertical punches, said vertical punches being adapted to move laterally of said Z-bar to the transverse positions of proposed holes in the bottom flange of said Z-bar, a bottom flange templet with scaled graduations thereon, an indicator therefor moved in unison with the transverse movement of said vertical punches whereby certain of said vertical punches may be moved transversely of said bottom flange to said positions of proposed holes.

20. In a punching machine through which a Z-bar is fed to bring the longitudinal positions of proposed holes in said Z-bar into alinement with punches selected from a plurality of horizontal punches, said horizontal punches being adapted to be vertically adjusted to the height of proposed horizontal holes, a web templet moved in unison with the vertical movement of said horizontal punches, stationary indicators therefor, whereby a certain horizontal punch or punches may be moved vertically across said web to said positions of proposed holes, means for rendering operable said certain horizontal punch or punches and means for operating such punches.

21. In a punching machine, in combination, a plurality of slidable punches and dies, means for feeding work through said machine in predetermined steps, and other means for sliding groups of said punches and dies in a plurality of differently disposed transverse directions across said work, said feeding of work and transverse sliding of said punches and dies serving to cause said punches and dies to register with proposed apertures in said work, and means for operating said punches.

22. In a punching machine, a vertically disposed group of slidably punches and dies, means for moving the same so that one or more selected punches is brought into operative juxtaposition with the transverse location of a proposed hole or holes in one or more of different transverse planes of a piece of work, a pair of rolling members for so advancing said work that the longitudinal location of said proposed hole or holes in said work is caused to register with the transverse location assumed by said selected punches, means rendering only said selected punches operable, and means for operating said selected punches.

23. In a punching machine, in combination, a plurality of variously arranged slidable punches and dies, means for feeding work through said machine by steps to aline a portion or portions of said work with a certain punch or punches, a traveling templet for indicating positions of proposed apertures in said work by graduations affected by the spacing of said apertures and the locations of the various punches, an indicator coacting therewith, means for moving said punches and dies transversely of said work, which means in conjunction with the feeding steps of said work enable said punches and dies to be brought into registration with said proposed apertures, and means for operating said punches.

24. In a punching machine, suitably supported slidable punch and die blocks carrying other punch and die blocks, the carried blocks being adjustable with respect to the blocks carrying them.

25. In a punching machine, a slidably supported punch block provided with a punch-carrying portion and an extension for slidably supporting another punch block, punches in both blocks, a slidably supported die block with a die-carrying portion and an extension for slidably supporting another die block, dies in both die blocks, means for adjustably setting the supporting and supported punch blocks in desired relation and means for so setting said die blocks, and means for synchronously moving all of said blocks.

26. In a punching machine, a punch block-supporting member, a punch block slidably held therein, punches in said block, an adjustable gag-operating device movable with said punch block during its sliding movement and through said block-supporting member and a gag adapted to be carried by its supporting device to co-act with any predetermined punch.

27. In a punching machine, a punch block-supporting member, separate but connected punch blocks slidably mounted therein, punches in each punch block, respective gags for the punches in the different blocks, and adjustable gag-operating devices for the respective gags movable with said punch blocks during the sliding movement and through said block-supporting member.

28. In a punching machine adapted to simultaneously punch in different planes any of a number of pieces of differently dimensioned work, dies of different length and punch stems approximately adjusted to said different planes, punches supported from said punch stems and punch-extension means for certain punches, said punch-extension means and linearly different dies adjusting the travel of the punches to their respective punching planes.

29. In a punching machine, a movable punch block-supporting member, and a stationary base, punch and die blocks slidably mounted, respectively, in said punch block-supporting member and said base, a revoluble shaft mounted in said base and extending through said movable punch block-supporting member, propelling devices on said shaft one being movable with said punch block-supporting member, actuating means connecting said propelling means and punch and die blocks, and means for turning said shaft.

30. In a punching machine, a movable punch block-supporting member and a stationary base, a plurality of punch blocks in the former and a plurality of die-blocks in the latter, means for synchronously moving said punch and die blocks in the same direction, punches in the punch blocks and dies in the die blocks, said punches and dies comprising sets each for perforating portions of a piece of work not accessible to another of said sets, and indicating means for each set of punches and dies, denoting the location of the latter with respect to said work operated by said die blocks.

31. In a punching machine, a base member, a movable punch block-carrying device mounted therein, a punch-carrying punch block slidably held in said device and a slidable die-carrying die-block mounted in said base member, propelling mechanism for said punch block-carrying device, actuating means for said propelling mechanism and means for synchronously moving said punch and die-blocks transversely of the work.

32. In a punching machine, a base member, a movable punch block-carrying device mounted therein, a punch-carrying punch block slidably held in said device and a slidable die-carrying die-block mounted in said base member, propelling mechanism for said punch block-carrying device, actuating means for said propelling mechanism, means for synchronously moving said punch and die-blocks transversely of work and means indicating the extent of such movement.

33. In a punching machine, a base member, spaced movable punch-carrying devices mounted therein, a reciprocatory actuating member spaced from said base member, a toggle mechanism for moving each punch-carrying device extending into said actuating member and a suitably controlled gag in the latter and normally located between said toggle mechanism but adapted to be shifted to render either toggle mechanism effective.

34. In combination in a punching machine through which work is adapted to be advanced, a movable punch, a relatively fixed die and a fixed stripper, said work being adapted to be fed between and guided by said fixed die and stripper.

35. In a punching machine, in combination, a punch block and a die block, a vertically disposed punch and die therein, both of said blocks being movable transversely of the work, a horizontally disposed punch and die, the former mounted in vertically movable punch blocks and the latter in vertically movable die blocks, means for feeding work, a spacing templet movable with said work, means for moving said vertical punch and die blocks transversely of said work, which means position said vertical punches and dies to produce vertical apertures at predetermined points, means for operating said punch and die blocks carrying said horizontally disposed punches and dies to produce horizontal apertures in said work at any desired altitude therein.

36. In a punching machine, a main body frame, a base casting mounted thereon and a vertically reciprocatory top plate positioned thereabove, slidable on a vertical shaft, means operable to actuate one or more horizontal punches, slidable means mounted in said top plate carrying a group of vertical punches and other slidable means mounted in said base casting carrying dies for said punches, means adapted to move said vertical punches and dies transversely of a piece of work, a plurality of vertically slidable horizontal punches and dies, means for vertically positioning said horizontal punches and dies, carriages adapted to advance said work whereby given longitudinally spaced points in said work are brought into alinement with certain selected vertical or horizontal punches, means rendering said selected punches operable, and means for actuating said top plate to operate said selected punches.

37. In a punching machine, in combination, a plurality of horizontally disposed punches and dies, mounted respectively in a vertically and horizontally slidable punch block and a vertically slidable die block, means adapted to move said punches and dies vertically and means for operating said punches horizontally.

38. In a punching machine, in combination, a main body frame, a base resting thereon, a top plate positioned above said base, a forward punch block, a back punch block clamped to said forward punch block, a plurality of vertical punch stems, some mounted to slide vertically in said forward punch block and others to so slide in said back punch block, punches attached to said stems, gags in said forward punch block adapted to be interposed at will between said top plate and any of said punch stems, forward and back die blocks in said base casting, dies retained thereby, and means for sliding said forward and back punch blocks and die blocks in unison transversely of the work to any desired position.

39. In a punching machine, in combination, a base, a top plate positioned above said base, connected forward and back punch blocks slidable with relation to said top plate, a plurality of vertical punches in both said punch blocks, selective means therefor, connected back and forward die blocks, dies in both forward and back die blocks, means for guiding and retaining work in place, means for sliding said punch blocks and die blocks in unison transversely of said work, means for advancing said work in predetermined steps through said machine, and means for thrusting downwardly said top plate to operate punches affected by said selective means.

40. In a punching machine, means for feeding work to bring the longitudinal positions of proposed apertures in said work into alinement with punches selected from a plurality of slidable punches which are adapted to be adjusted in a vertical direction across said work to produce horizontal apertures therein at desirable altitudes, in combination with a base having a wall, a horizontally slidable head operatively connected with said base, a vertically adjustable punch block supporting a horizontal punch carried by said head, a vertically adjustable die block and die, a top plate, toggle mechanism comprising a plurality of legs bearing against a common central member and against the wall of said base casting, and against one of said heads and a toggle block, means for rendering said toggle mechanism effective, and means for downwardly moving said top plate to actuate said toggle mechanism to operate a punch.

41. In a punching machine, means for feeding work to bring the longitudinal positions of proposed apertures in said work into alinement with a vertically adjustable punch adapted to produce horizontal apertures in said work at desired altitudes, in combination with a die block and a horizontally slidable punch block carrying a punch, a slidable horizontal head carrying said punch block, a top plate, toggle mechanism comprising three similar legs which bear against a common pivotal member, means for locking said legs in operative position, and means for rendering said toggle mechanism effective to operate its associated punch.

42. In combination in a punching machine, a plurality of horizontally disposed punches of different diameters and dies therefor, means adapted to synchronously move said punches and dies vertically, means adapted to render operable a single selected punch of predetermined diameter and means for actuating said punch.

43. In combination in a punching machine, means adapted to grasp and to advance a Z-bar therethrough, a plurality of individually selected punches of different diameters adapted to punch the web of said Z-bar and a plurality of punches adapted to simultaneously punch the flanges of said Z-bar.

44. In combination in a punching machine, a vertically movable punch, a horizontally movable punch, angularly disposed dies for said punches adapted to serve as guides for angularly shaped material to be punched, a toggle adapted to actuate said horizontally movable punch and a slide adapted to synchronously actuate said toggle and said vertically movable punch.

45. In combination in a punching machine, a plurality of differently directed punches, relatively fixed dies therefor, and stripping means for the differently directed punches, said fixed dies and stripping means adapted to have work fed therebetween and to guide said work.

46. In combination in a punching machine, a plurality of differently directed punches, relatively fixed die devices therefor and a unitary stripping means for said differently directed punches, said die devices and unitary stripping means adapted to have work fed therebetween and to guide said work.

In witness whereof I have hereunto set my hand in the presence of two witnesses.

FREDERICK A. STEVENSON.

Witnesses:
 ELIOT W. STUCKER,
 ARNOLD L. PEPPER.

Copies of this patent may be obtained for five cents each, by addressing the "Commissioner of Patents, Washington, D. C."